(No Model.)

R. S. PENNIMAN.
METHOD OF MANUFACTURING NITRATE OF AMMONIA.

No. 478,067. Patented June 28, 1892.

UNITED STATES PATENT OFFICE.

RUSSELL S. PENNIMAN, OF DOVER, NEW JERSEY, ASSIGNOR OF TWO-THIRDS TO JOHN C. SCHRADER, OF SAME PLACE, AND WILLIAM C. WOOD, OF WASHINGTON, DISTRICT OF COLUMBIA.

METHOD OF MANUFACTURING NITRATE OF AMMONIA.

SPECIFICATION forming part of Letters Patent No. 478,067, dated June 28, 1892.

Original application filed July 11, 1888, Serial No. 279,649. Divided and this application filed August 20, 1890. Serial No. 362,484. (No specimens.)

*To all whom it may concern:*

Be it known that I, RUSSELL S. PENNIMAN, of Dover, in the county of Morris and State of New Jersey, have invented certain new and useful Improvements in the Manufacture of Nitrate of Ammonia; and I do hereby declare that the following specification, taken in connection with the drawings furnished and forming a part of the same, is a clear, true, and complete description of my said invention.

In my application for Letters Patent filed July 11, 1888, Serial No. 279,649, I disclosed the invention to be hereinafter described in connection with the production of protected nitrate of ammonia and to which my said original application has been now restricted, the present division thereof relating to the dehydration of the nitrate and also to its development in a solid form from the liquors or brine containing the same in solution.

As stated in my said original application, I have radically departed from the prior method of developing nitrate of ammonia in a solid form, in that, instead of partially evaporating the water from the solutions containing the nitrate and then cooling the same, as in the slow and expensive process of crystallization, I progressively reduce the nitrate to a liquefied and thoroughly-dehydrated condition by means of evaporation and employing high temperatures, accompanied with the injection of air into the highly-heated liquefied mass, thus securing the nitrate in a purer and more perfect condition than is possible by the crystallizing process or even by melting the crystals, unless the air be then injected, as by me, in accordance with this portion of my invention. When the liquefied nitrate has been thus thoroughly dehydrated, I then cool it and mechanically convert it into a divided but solid condition.

After describing my invention in connection with the accompanying drawings the novel features appropriate to this divisional application will be duly specified in the clauses of claim hereunto annexed.

Figure 1:
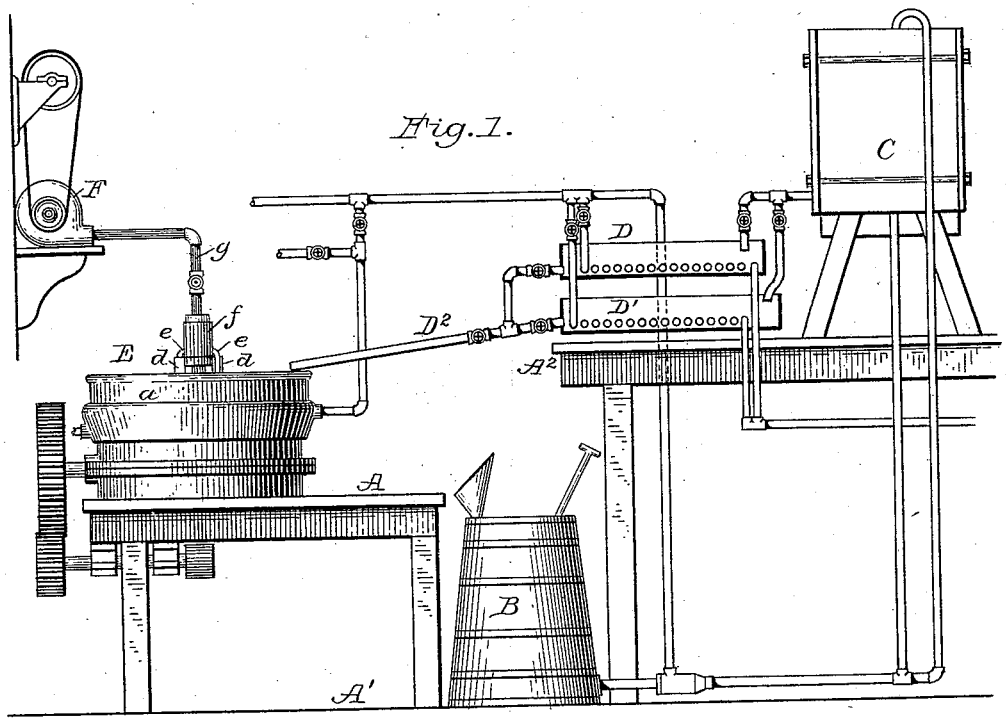
Figure 2:
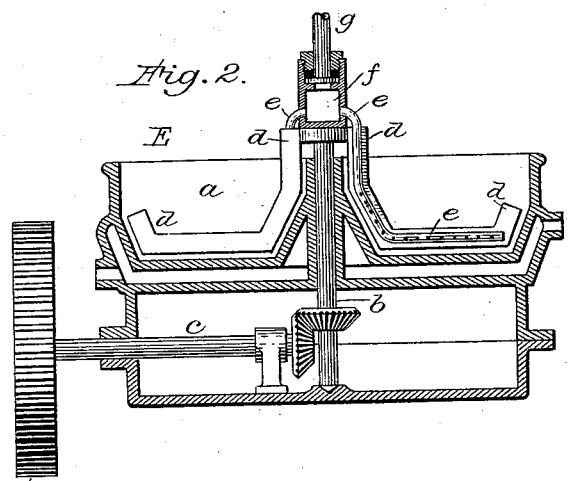

Referring to the drawings, Figure 1 illustrates in elevation an apparatus as devised by me for use in accordance with my said invention. Fig. 2 illustrates in central vertical section the portion of the apparatus in which the dehydrated liquefied nitrate is developed, and also wherein it is converted mechanically into a divided or grained condition.

This apparatus is mounted partly on suitable platforms A A$^2$ and partly on a main floor A', as clearly indicated. Upon the main floor a tank B is located for the reception of the ammoniacal liquor and acid and provided with means for agitating its contents. Said tank B is connected by suitable pipes with one or more settling-tanks C on a trestle upon the upper platform, and the contents of said tank B are transferred to said settling-tanks by means of a steam-ejector or suitable pump. From the settling-tank the brine is delivered into a series of pans, of which but two are shown at D and D', each of which contains a steam-coil. Said pans deliver their contents through pipe D$^2$ to a machine E, in which the nitrate is raised to a high temperature and first thoroughly dehydrated while in a liquefied condition and then cooled and mechanically converted into a divided but solid condition. This machine consists in part of a pan $a$, which is jacketed and coupled with steam-pipes and with other pipes, which enable an alternating supply of steam and of cool water to be delivered to and taken from the interior space clearly shown. Said machine also has a central hub containing a vertical shaft $b$, geared to a driving-shaft $c$. At its upper end the shaft $b$ carries a set of arms $d$, which serve as stirrers when said shaft is rotated. One (or more) of said arms carries a perforated pipe $e$, which at its upper end communicates with an air-chamber $f$, communicating by way of a pipe $g$ with a blower F or other suitable air-pump.

In working this apparatus in the best manner various impurities may be disposed of by gravitation, the liquid being allowed to settle both in the settling-tank and then again after heating and evaporating in the pans D D'; but some of the pans may be used wholly for evaporation and others for settling.

From ninety to ninety-five per cent. of the water can be driven off in the pans without employing temperatures liable to cause a decomposition of the nitrate, but the remaining water is expelled in the pan $a$ of machine E by the use of high temperatures approximating to 320° Fahrenheit, (which should never be exceeded,) accompanied by the injector of air, which carries off such water as cannot be expelled by heat alone, and if attempted great danger will be incurred in the loss of the nitrate. The air not only serves to carry off moisture, but also to keep the temperature below the safety limit.

So far as my knowledge extends I am the first to thoroughly dehydrate nitrate of ammonia in a liquefied or melted condition, and I believe that my success is dependent upon the use of air injected as described. For converting this liquefied dehydrated nitrate into a solid but divided form the steam is cut off from the pan $a$ and cold water substituted therefor, so as to cool down the pan and its contents, during which the air is also cut off, but the stirrers kept in motion for mechanically disintegrating the gradually-cooled mass until the whole is converted into a divided or grained condition.

As a rule the most available ammoniacal liquors are derived from concentrated wash-waters of gas-works, and they generally carry about fifteen per cent. of available ammonia in the form of carbonates and sulphides. I prefer to work about five hundred gallons of such liquor at a charge variable according to the strength of the liquor and of the nitric acid used, the latter being introduced gradually while the mixture is being well stirred, and in all cases the brine should be slightly alkaline. For securing specially-pure nitrate ample opportunities for settling the brine should be afforded.

I am aware that blasts of air have been widely used as aids to evaporation in various processes; but I believe I am the first to employ air for the evaporation of water from solutions containing either ammonia or its salts not only with a view to rapid service, but also for obviating decomposition of the salts incident to those high temperatures which are essential for maintaining the nitrate in a liquefied condition, during which complete dehydration can be effected.

Having thus described my invention, I claim as new and appropriate to this division of my aforesaid original application—

1. The improvement in dehydrating nitrate of ammonia, which consists in reducing the nitrate to and maintaining it in a liquefied or melted condition under high temperatures approximating to the decomposing limit and then injecting into the mass blasts of air for conveying therefrom all watery matter.

2. The improvement in dehydrating nitrate of ammonia, which consists in reducing the nitrate to a liquefied or melted condition under high temperature, then mechanically agitating the mass and also injecting blasts of air into the liquefied mass for obviating liability of injury to the nitrate by decomposition from overheating, and also for fully eliminating watery vapors, substantially as described.

3. The improvement in the process of manufacturing nitrate of ammonia, which consists in dehydrating the nitrate while in a melted condition by mechanical agitation accompanied with the injection of air into the mass for obviating liability of injury to the nitrate from overheating, and also for speedily eliminating watery vapors, then cutting off the air, cooling the nitrate, and developing it into grains by mechanical agitation while cooling, substantially as described.

RUSSELL S. PENNIMAN.

Witnesses:
J. T. CORLEW,
SYDNEY T. SMITH.